Figure 1:
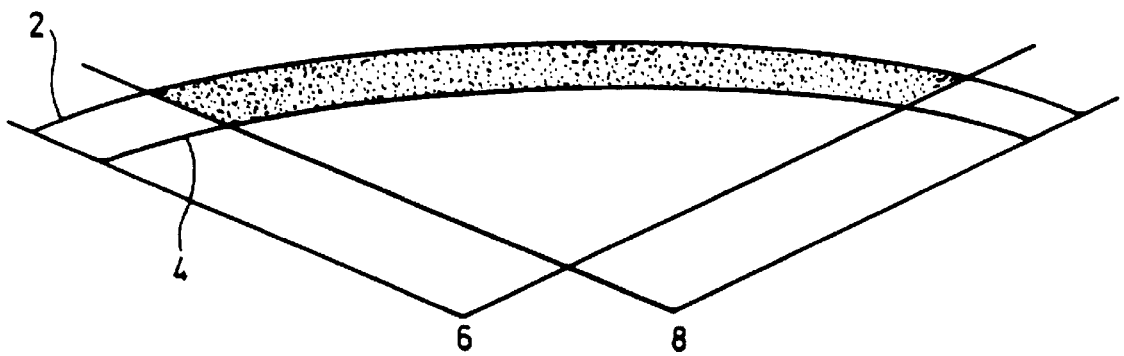

United States Patent [19]
Benjamin

[11] Patent Number: 5,920,285
[45] Date of Patent: Jul. 6, 1999

[54] POST-RECEPTION FOCUSING IN REMOTE DETECTION SYSTEMS

[75] Inventor: Ralph Benjamin, Bristol, United Kingdom

[73] Assignee: University of Bristol, Bristol, United Kingdom

[21] Appl. No.: 08/867,900

[22] Filed: Jun. 3, 1997

[30] Foreign Application Priority Data

Jun. 6, 1996 [GB] United Kingdom ............... 9611800

[51] Int. Cl.⁶ .................................................. H01Q 3/22
[52] U.S. Cl. ........................... 342/368; 342/374; 342/22
[58] Field of Search ............................... 342/22, 25, 368, 342/374

[56] References Cited

U.S. PATENT DOCUMENTS

| | | | |
|---|---|---|---|
| 3,178,711 | 4/1965 | Case, Jr. ...................................... | 342/25 |
| 5,182,562 | 1/1993 | Witte .......................................... | 342/25 |
| 5,339,080 | 8/1994 | Steinway et al. .......................... | 342/22 |

*Primary Examiner*—Mark Hellner
*Attorney, Agent, or Firm*—Baker & Botts, L.L.P.

[57] ABSTRACT

An apparatus is provided in which individual transmit elements (18) of a transmit array are actuated in turn in order to interrogate a search volume Signals reflected from the volume are received by one or more reception elements (20) of a receive array and are recorded. The propagation parts to a selected cell are calculated and appropriate phase and or time shifts are inserted into the recorded data to simulate, post reception, the shifts that would have occurred if either or both of the transmit and receive arrays had been focused on the cell using phased array beam steering techniques.

28 Claims, 1 Drawing Sheet

POST-RECEPTION FOCUSING IN REMOTE DETECTION SYSTEMS

The present invention relates to a method of, and apparatus for, post reception focusing in remote detection systems.

Remote detection systems, such as radar system, scan a beam of energy through a predetermined search space in order to locate objects therein. Many radar systems still perform this scanning by the physical rotation of a radar dish. However, phased array radar systems perform beam steering by simultaneously powering a plurality of transmit elements for each direction of look. The signals supplied to the transmit elements are collectively shifted in phase so that the individual signals constructively interfere along a chosen path and destructively interfere along other paths. Thus, the phase and optionally the power of the signals supplied simultaneously to each of the elements must be controlled separately for each direction of look or in the case of near field focusing for each focal resolution cell examined.

According to a first aspect of the present invention, there is provided a remote reflector detection system, comprising a plurality of transmitting elements, at least one receiving element, and processing means for processing signals received by the at least one receiving element, in which the transmitting elements are energised one at a time and the signals received by the at least one receiving element for each actuation of the transmitting elements are processed so as to bring signals propagating from at least two of the transmitting elements to at least one of the at least one receiving element via a selected potential reflector location into coincidence.

The processing of the received signals can be repeated in respect of all desired reflector locations.

Thus, the applicants have realised that it is possible to significantly reduce the cost, complexity and power requirements in the transmitter portion of a detection system at the expense of increased post reception computation.

The reflector may be an object located within the medium, a discontinuity within the medium or an inhomogeneous region within the medium.

It is thus possible to provide an apparatus in which the reflectivity of a plurality of cells within a search volume are investigated, and the reflected radiation is analyzed in order to determine whether one or more of the cells contains a reflector.

Preferably, a plurality of receiving element to are provided in an array. The signals received by each of the receiving elements can be further processed by the introduction of appropriate phase or time shifts between the received signals to focus or beam steer the response of the receiving array of elements.

In general, there may be T transmission elements and R receiving elements. Each of the T elements is actuated in turn and the data received by each of the R receiving elements are recorded or stored. The data is processed so as to bring the T×R signals from each transmit element via a chosen potential reflector location to each receive element, into time and phase coincidence, just as it the transmit and receive arrays had been focused onto a given point in space. Equivalent processing operations can be performed for all 3D cells resolvable within the intrinsic constraints of the antenna and modulation systems. Thus, a single actuation of each transmit element can take the place of separate actuations for all distinct joint focusing conditions of the transmit and receive arrays.

The elements of the transmit and receive arrays may be provided within a single physical array with each element of the array being selectively connected to a transmitter or a receiver.

This arrangement will be herein referred to as a monostatic mode of operation. Alternatively, dedicated transmit and dedicated receive elements may be provided. These form electrically discrete arrays, although physically the arrays need not be discrete. These arrangements will be referred to as bistatic systems.

Advantageously, the receive signals are recorded and stored in digitised form. The recording period is required to span that time period (echo time) starting with a return signal from the nearest desirable target range, and finishing with a signal returning from the furthest target range. The phase and advantageously the amplitude of the returning signals are recorded.

The energy may be in the form of electro-magnetic radiation. Radio frequency radiation falling within the microwave or millimeter region of the electro-magnetic spectrum are preferred radiation. Alternatively acoustic waves, such as ultra-sound, may be used.

The detection system may be incorporated within a radar system to detect remote objects. Alternatively, the system may be incorporated within a near-field radar system, or near-field acoustic ranging system, in order to detect discontinuities or objects within a medium. Examples of such systems are ground penetrating radar systems for mint detection, or medical diagnostic system for non-invasive imaging.

The terms "near field" and "far field" are understood by the person skilled in the art. However, by way of explanation, known phased array antennas used in radar systems of the type used to detect aircraft perform beam steering and consequently are intended to produce a beam having a substantially planar wavefront. The plane wave front eventually diverges at an angle which decreases with increasing size of the initial plane aperture. The orientation of this planar wave front steers it in two dimensions (e.g. azimuth and elevation) and its planar nature focuses it to infinity. Any convex curved wavefront would generate a more widely diverging beam, and a concave wavefront would converge onto a focal point and diverge from there onwards. This initial convergence onto a "near-field" focal point is exploited in the present invention. Quite generally, the near field describes the region near the antenna where the wavefront shape is relatively complex and is still evolving towards the narrow divergent beam that is observed in the far field.

Preferably the frequency of the electro-magnetic radiation or acoustic wave is adjustable so as to set the wavelength thereof in the medium to a predetermined wavelength. The speed of propagation of electromagnetic or acoustic radiation depends on the physical nature of the propagating medium. Since the resolution achieved is a function of the wavelength in the medium, the use of a variable frequency electromagnetic wave or acoustic wave source allows the resolution to be controlled. In, for example, a ground penetrating radar system constituting an embodiment of the present invention, the wavelength of the microwaves in moist soil is between ⅓ and ⅛ of the free space wavelength. If the frequency of operation is kept constant, these changes in wavelength would affect the attenuation in the course of ground penetration and the focusing resolution of the apparatus. By controlling the frequency of operation, it is possible to maintain the wavelength in the medium at a substantially constant value, thus maintaining a substantially constant resolution and minimising changes in attenuation. The characteristics of the medium (e.g. attenuation and propagation speed) may, for example, be determined by transmitting signals of at least one frequency (and normally two or more frequencies) between two sensor probes in contact with the medium and measuring the phase shift and/or attenuation(or changes thereof) between the transmitted and received signals. Alternatively these measurements may be performed by back scatter measurement techniques.

Preferably impedance matching means is provided intermediate the or each antenna or the plurality of transmitting elements and the at least one receiving element and the medium. In embodiments employing electro-magnetic radiation as an interrogating signal, the or each antenna may be faced with a compliant sheet matching the observed characteristics of the medium. The electrical matching of the antenna elements with the medium substantially prevents energy being reflected back to the transmitter. The sheet may be in contact with the medium thereby providing effective continuity of the bulk impedance between the antenna and the medium. Alternatively, the index matching sheet may be spaced from the medium such that reflections from the sheet (for example from the face nearest the sheet) and from the surface of the medium undergo destructive interference and substantially cancel one another. The storage or recording process generates a time-bracket of signals from each transmit element via the propagation medium to each receive element. Synthetic focusing comprises selecting from each of these brackets that sample whose path delay is consistent with having passed from the given transmit element to the given receive element via the selected focal cell, and summing all these contributions in a phase coherent manner. However, in near-field focusing, there is likely to be a wide variation in the two-way path-length from that for the transmit and receive element pair closest to the selected focal cell to that for the element pair furthest away. Since the medium is likely to be lossy, and attenuation increases exponentially with path length, this results in an even wider variations of signal contributions from pair to pair. But effective focusing requires substantially equal contributions from all components. Hence the signals from the shorter two-way paths are preferably attenuated to match those from the longer paths.

A co-pending application having the same priority date and applicant as the present application describes searching for buried mines by means of a radar, near-field focusing onto all relevant resolution cells in turn within a search volume. A specific example is described, where each of two triplets of disc antennas searches a volume of 1 m×1.5 m×0.6 m with 5 cm 3D resolution, by focusing sequentially onto all 7200 resolution cells so defined. The transmit antennas are multi-element arrays which are focused using the principles of mutual interference between a plurality of transmitted signals. This results in many transmissions into the same volume, each restricted to examining a single voxel.

With the phased array type spot-focused operations each of 7200 transmissions involves exciting all elements of the transmitting antenna. In the basic form of the present invention the aggregate power transmitted is reduced 7200-fold, for the same performance, by using all transmissions from all antenna elements to contribute in full to the examination of all 7200 resolution cells, as follows:

Each operation of focusing onto one resolution call involves the coherent alignment of the signals from all relevant transmitting ant elements via the selected focal cell to all relevant receiving antenna elements. Consider the bistatic case. If the elements of the transmitting array are energised one at a time, the amplitudes and phases of the corresponding received signals can be recorded concurrently for all elements of the receiving array, at all relevant path delays. This process is repeated for all the transmit-array elements. The signals for each, or selected, cells can then be analyzed. For each 3D cell, the path delays from each transmit-antenna element via that cell to each receive-antenna element are calculated or looked up and used to extract the corresponding signal from the stored data. These contributions can then be scaled in power, for loss normalisation, and further weighted for any taper, for side-lobe reduction, associated with the relevant transmit and/or receive antenna element. Since these scaling and weighting operations are applied to the detected received signal, they scale signal and noise alike (unlike transmitter weighting, which degrades this signal/noise ratio).

In a monostatic implementation, each of the N elements of the array has to transmit in turn. At first sight, it would appear that it is necessary to record the signals received in all the N−1 other elements. However, for full information, it is sufficient to record the signals received in half of these elements:—half the two-way paths will be observed with element i transmitting and element j receiving, and half with j transmitting and i receiving, where i and j represent selected ones of the N elements ($i,j \leq N$). However, all elements must be used both for transmitting and receiving, since we cannot observe a path between two transmit-only elements or two receive-only elements. Note that for concurrent (i.e. at transmission) focusing, for each distinct 3D resolution cell, we have to control the phases of N transmit paths plus (if bistatic) N receive paths. Each with a phase tolerance of $\pm\delta$ (where $\delta$ is, say, $10°$). This contrasts with synthetic focusing, where we have to control $N(N-1)/2$ two-way paths per resolution cell (if bistatic $N^2$ paths) with a tolerance of $\pm 2\delta$. (in near-field focusing, unlike synthetic apertures in radio astronomy, equally-spaced pairs of elements do not share a common path delay.) Thus we pay the price of $(N(N-1)/2)$-fold (or N-fold) increased processing for the dramatic saving in transmitter power.

Where the same N antenna elements are used in a monostatic operation, the transmit sequence may be visualised by regarding the elements as being positioned around the circumference of a circle, where the reception of the signal is limited to the N/2 elements immediately behind the current transmitting elements. When all of the transmitting elements have been actuated once, this ensues that each of $N(N-1)/2$ paths between distinct pairs of elements is observed once.

Advantageously, the arrays of antenna elements may be moveable so as to conform to the surface profile of a medium. Sensors may be provided to measure the vertical displacement, roll and pitch of the antenna array or arrays in order that the position of each element in the or each array can be calculated and further corrections to the phase or travel time of the signals made so as to accurately perform the post reception focusing.

Advantageously, the transmitted signals are in the form of pulses. In an example of a ground penetrating radar system, microwave pulses possibly of the order of nanosecond duration are transmitted. Alternatively, a continuous wave signal can be frequency modulated in a linear manner (chirped) typically over a range of order of GHz or less (the frequency domain equivalent of the time domain pulse). The technical difficulties of pulse forming or frequency modulation are reduced in the case of an acoustic detection system due to the slower propagation speed of the interrogating energy.

Each discriminable received pulse, corresponding to a single transmitted pulse, will be the resultant of the reflections from all inhomogeneities within the volume defined by:

(1) the directional pattern of the transmitting element (or sub-array),
(2) the directional pattern of the receiving element (or sub-array),
(3) the leading edge of the received pulse,
(4) the trailing edge of the received pulse.

Preferably, each receive signal is correlated with the transmitted signal. This enables the correct arrival time the receive signal to be established. The results of the correlations can be recorded for subsequent processing.

The transmit and receive antennas may be mounted on a boom for use in a mine detection system. The boom may be mounted on a vehicle.

The system can also be used for medical diagnosis. Growths or tumours frequently have a different metabolism to the surrounding tissue and frequently have a different impedance thereto. Thus the growths or tumours will reflect microwaves or ultra-sound and consequently can be located using this technique.

Each transmitter element may be actuated more than once. This allows the number of corrolators to be reduced since they can be time shared. This does, however, reduce the overall power saving, although the reduction in peak transmitted power (since the elements are still actuated sequentially) remains unchanged. Additionally, the relative sizes of the transmit and receive arrays can be adjusted to increase the number of transmit elements and decrease the number of receive elements. This again allows the number correlators to be reduced.

According to a second aspect of the present invention, there is provided a method of detecting a remote reflector, comprising actuating sequentially individual elements of a transmit array to emit respective signals, recording reflected signals received at least one element of a receive array for each actuation of the transmit elements, and processing the received signals to shift them so as to synthesise in the received signals the delays and phase shifts that would have been introduced between the signals transmitted from the plurality of transmit elements in order to steer or focus the beam using phased array techniques.

Figure 2:
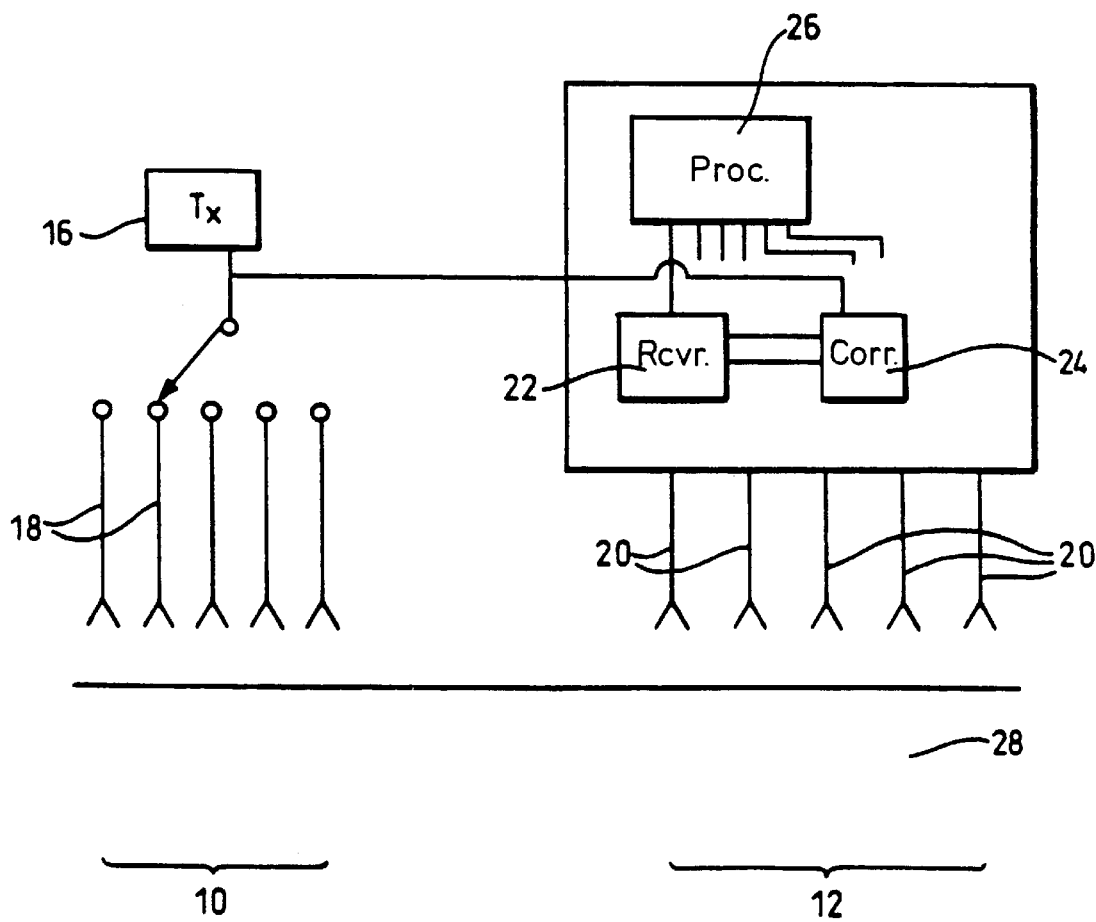

The present invention will further be described, by way of example, with reference to the accompanying drawings, in which:

FIG. 1 illustrates the loci of the leading edge of a received pulse and trailing edge of a received pulse for a bistatic system; and FIG. 2 schematically illustrates an embodiment of the present invention.

For a bistatic configuration, leading edge 2 and trailing edge 4, i.e. the loci of constant two-way path length of a pulse, are ellipsoids of revolution, with the relevant transmit 6 and receive 8 elements as their foci. (Thus they reduce to constant-range spheres in a monostatic system). The $N^2$ pairings of transmit and receive elements generate $N^2$ such zones, differing in lateral position and curvature, and these overlap and combine coherently only in the selected resolution cell, whose size is determined by the wavelength and the pulse-length, and by the focusing and bistatic convergence angles. Exactly the same selection mechanism is in operation (in a less obvious manner) in conventional quasi-optical focusing.

In a ground penetrating radar system (schematically illustrated in FIG. 2) transmit and receive arrays 10 and 12 have 150 elements each, and are positioned such that the difference between the longest and shortest likely two-way 3D path lengths is approximately 3 m. In the arrangement shown in FIG. 2, a transmitter 16 is selectively connectable to each one of the plurality of transmitter elements 18 within the transmit array 10. Alternatively, independent transmitters may be activated sequentially.

Each of the antenna elements 20 of the receive array 12 are connected to a respective receiver 22 which includes a data storage device, and a correlator 24. Only one receiver and correlator block is shown for clarity. The correlator 24 acts to cross-correlate the signal received from the antenna element 20 with the transmitted signal. The outputs of all of the receivers are sent to a data processor 26 which analyses the received signals in order to determine whether or not an object, such as a mine is located in the volume of any of the search cells within the ground 28. Hence, for a 5 cm resolution inphase "I" and quadrature "Q" correlators 24, associated with each receive element, have to be sampled up to 60 times for each transmit-element activation. Hence, in data collection the scheme, in its basic form, would need perform 18000 correlations:—150 (arrays elements)×60 (discriminable phase intervals)×2 ("I" and "Q" phases)= 18000. In processing these data, we have to compute the sum of 150×150=22500 complex contributions per focal cell, for each of a total of 7200 resolution cells. This comes to a total of $7.24 \times 10^3$ additions. Typically, the mechanical limitations of a contact search would impose a minimum time of 6 seconds to advance the search area 1.5 m forward, for the next search scan, corresponding to a computation rate of $1.2 \times 10^7$ additions, which is a fairly trivial task.

In a contact mine search system, a sensor on a boom ahead of the search vehicle, may have to be preceded by a non-ferrous cutting and clearance tool on a further forward extension of the sensor boom. Since the ground will normally be rough, good contact may require the front-face of the antenna arrays to be faced with a soft mat of the appropriate index-matching material. For such contact, it is necessary to place the antenna onto the ground and take a series of measurements, and then lift the antenna and move it to the next, adjacent ground position. The ground is also likely to be uneven on a larger scale. A T-shaped boom projects forward from the operating vehicle, far enough to ensure the safety of the vehicle in an accidental mine explosion. Antenna arrays are mounted at a front-end crosspiece of this boom. Each of these arrays can adapt to the gross variations of the ground, both vertically and by tilting about the roll and pitch axes, with sensors measuring these displacements, so that the excitation can be adapted accordingly.

With in-contact arrays, an ultra-sonic acoustic version of the apparatus can also be implemented. This would perform best in wet ground, the very conditions where a microwave system is most limited. The echoing delay times would of course be enormously larger than in the electro-magnetic variant. However, as shown below (for the electro-magnetic scheme), any in-contact scheme the search rate is limited entirely—and quite severly—by non-sensor considerations.

The data acquisition time is merely the time for each of say 150 transmit elements in turn to emit a single pulse and then to wait for the largest relevant path delay to the receivers before the next element emits its pulse. With either the electro-magnetic or ultra-sonic version of the invention, that time is negligible compared to the mechanical processes of manipulating the antenna or transducer array in contact with the ground. Hence the computation for the synthetically focused 3D search can also be spread over the time taken by these mechanical processes.

For instance, a cyclic search scheme may be as follows:

| | | |
|---|---|---|
| 1. | fit discs to ground | 3 s |
| 2. | sequential beam forming and search | — |
| 3. | advance boom by 1.5 m (vehicle remaining stationary) | 6 s |
| 4. | repeat 1–3 | 9 s |
| 5. | repeat 1–3 | 9 s |
| 6. | repeat 1–2 | 3 s |
| 7. | advance vehicle 6 m, whilst retracting boom by 4.5 m | 15 s |
| | TOTAL DURATION | 45 s |

Subsequent cycles would repeat steps 1–7, above. This scheme is designed to minimise the time taken by the mechanical processes, which dominate the search rate. These arbitrary but not unrealistic figures give a total of 45s for searching 2 m (width)×6 m (advance)×0.6 m (depth),— i.e. an average advance of 1 m every 7.5 seconds.

The highest time resolution will be required for the lowest refractive index. The refractive index P of ground varies between 3 and 8, when P=3. For a path-delay resolution of 5 cm, this will then correspond to a time resolution of 0.5 nanoseconds, equivalent to a bandwidth of 2 GHz. If "simple" pulse operation and direct phase sampling in such a short interval proves too expensive in terms of components with very few cycles per pulse, equivalent results can be obtained by moans of a linear frequency modulation (chirp) of ±1 GHz, with an appropriately carrier frequency. The received signal has to be correlated (in I and Q) with a distinct delayed replicas of the transmitted waveform for each discrete resolvable pathlongth. In this case, however, each correlator is occupied for the full duration of the chirp sweep, thus requiring a bank of parallel correlators for each receive-antenna array. The magnitudes of the resulting correlation integrals can, once again, be recorded digitally. With longer pulses the same range resolution can be retained through convergence focusing, but it is then subject to range coordinate side lobes.

It is possible to drive each transmit element k times, so that 1/k the number of receive correlators can be time-shard, at the expense of a k-fold reduction in the power saving achieved. The number of receive correlators could be reduced by yet further factor, again at the cost of a proportionate increase in the total transmitted power, by increasing the size of the transmit antenna 10 and reducing that of the receive antenna 12, by a common ratio, thus keeping the number of path-length combinations constant. Both the preceding measures increase the data-collection time. However, in no circumstances does the electronic observation time impose any constraints on the system design. Yet a further savings measure (which however does not affect the data-collection time) is to divide the angular range covered by the receive antennas into, subarrays of, say, 3 by 3 elements. Since the solid angle of these subarray beams would be 9 times narrower than the single-element beam, the subarrays, jointly have to be phase-steered into 9 angular sub-ranges. Fine steering, within each sub-range, can be performed by differential phasing ("squinting") of the subarrays. Thus each receive element requires phase-steering to 9 discrete directions, and hence each transmit element has to be driven 9 separate times, reducing the power saving accordingly. On the other hand, for each of the subarray look angles, only the composite output of each receive sub-array would need to be correlated with each transmit signal. Hence the number of correlators is reduced 9-fold (each being used 9 times, once for each sub-array squint angle).

In the non-contact mode of operation, the range-wise (i.e. distance along travel path) dimension of volume to be searched electronically using the data from the 150×150 path combinations, would be reduced from 150 cm (30 voxels) possibly to 30 cm (6 voxels) i.e. one disc diameter, but probably to 1 voxel. This would however have to be repeated for very 30 cm or 5 cm of advance of a vehicle incorporating the detection system, respectively. The number of (i,j) pairs to be covered would of course be unchanged. However, the difference between the maximum and minimum 2-way path delays to be covered would be reduced to only about 90 cm, as compared to 3 m, thus permitting a pro rata reduction in the number of correlators. Here, too, the electronic search rate will not limit the overall search rate achievable. The transmitted and returning wavefronts may undergo refraction at the air-ground interface. However corrections for this can be made based on measurements or assumptions of the propagation speed within the ground.

Since the components of a focused spot are obtained sequentially, the technique (in all its variants) is best suited to observing static situations as in mine search (or tumour diagnosis). However, specific hypotheses of target movement can also be covered.

Synthetic focusing can also be applied to far-field radars. In that case, the previous range-dependent 3D beam focusing is reduced to range-independent 2D beam forming and steering. Hence the number of incremental delays required is drastically reduced, and indeed these delays can be implemented as phase shifts, if desired. Range is then resolved purely by arrival time, and the data recorded at each receive antenna element must cover the full echoing time to maximum range. Since the number of independent beams, which can be formed in a phased array, is equal to the number of elements, the data collection time, with sequential transmission from all ant elements in turn, is the same as for a conventional phased array performing a sequential search of all distinct beam directions. However, the transmitted power is much reduced. Like the phased array, the synthetically-focused system can save both search-time and processing, when searching a more restricted angular range. For synthetic beam forming, this could be achieved by configuring the transmit and receive antennas as sets of sub-arrays, with their (common) beamwidth and "squint" angle matched to the desired angular coverage.

Because such synthetic beam forming depends on the coherent combination of data collected sequentially, it is best matched to scenarios which can be regarded as static during the data-collection frame, but where we wish to observe frame-to-frame changes—with appropriate inter-frame intervals. This condition would be less restrictive in single-dimensional synthetic beam forming and steering: For instance, for a vertical receiver-synthesised scan, 20 horizontal lines of transmit elements, within a 300-element circular transmit array, might be energised sequentially, and so the minimum target coherence time required would be reduced in the ratio 20/300=1/15. Thus there should be further applications where, for instance, vertical synthetic beam forming and steering would be combined with rotational, translational or phased-array scanning in the horizontal plane.

I claim:

1. An apparatus for detecting a reflector, comprising a plurality of transmitting elements, and a plurality of receiving elements, and processing means for processing signals received by the receiving elements, in which the transmitting and receiving elements are arranged in two dimensional arrays, the transmitting elements are energised one at a time and the signals received by the plurality of receiving elements, for each actuation of the transmitting elements, and the signals are processed so as to bring signals propagating from at least two of the transmitting elements to at least one of the plurality of receiving elements via a selected potential reflector location into coincidence.

2. The apparatus as claimed in claim 1, in which the signals received by each of the receiving elements is further processed by the introduction of appropriate phase or time shifts between the received signals to focus or beam steer the response of the receiving array of elements.

3. An apparatus as claimed in claim 1, in which there are T transmission elements, and R reception elements, and in which each of the transmission elements is actuated in turn and data received by each of the reception elements are recorded or stored, and in which the data are processed to bring the T×R signals from each transmit element via a chosen potential reflector location to each receive element into time and phase coherence.

4. An apparatus as claimed in claim 1 in which the transmit and receive elements are provided within a single physical array with each element being selectively coupled to a transmitter (Tx) or a receiver (Rx).

5. An apparatus as claimed in claim 1, comprising dedicated arrays of transmit and receive elements.

6. An apparatus as claimed in claim 1, in which the received signals are recorded during a recording period starting with a signal returned from the nearest desirable target range and finishing with a signal returning from the furthest target range.

7. An apparatus as claimed in claim 6, in which the phases of the returning signals are recorded.

8. An apparatus as claimed in claim 6, in which the received signals are recorded and stored in a digitised form.

9. A apparatus as claimed in claim 1, in which the transmitting elements emit one of electromagnetic radiation and acoustic waves.

10. An apparatus as claimed in claim 9, in which the electromagnetic radiation is one of microwave and millimeter wave radiation.

11. An apparatus as claimed in claim 9, in which the frequency of the one of electromagnetic radiation and acoustic wave is adjustable as to set the wavelength thereof in the medium to a predetermined wavelength.

12. An apparatus as claimed in claim 9, in which the propagation characteristics of the medium are measured by back scatter or by transmitting signals of at least one frequency between at least two sensor probes and measuring the phase shift between the transmitted and received signals.

13. An apparatus as claimed in claim 1, in which the transmitting elements and the at least one receiving element form at least one antenna, and impedance matching is provided intermediate the or each antenna and the medium.

14. An apparatus as claimed in claim 13, in which the at least one antenna is faced with a sheet matching the characteristics of the medium.

15. An apparatus as claimed in claim 14, in which the sheet is compliant so as to permit operation in close contact with a rough surface.

16. An apparatus as claimed in claim 13, in which the at least one antenna is associated with an index matching sheet spaced from the medium such that reflections from the sheet and from a surface of the medium undergo destructive interference.

17. An apparatus as claimed in claim 1, further comprising means for attenuating signals having short two-way path lengths to match those from longer paths.

18. An apparatus as claimed in claim 4, in which the at least one array of antenna elements are moveable so as to conform to the surface profile of the medium.

19. An apparatus as claimed in claim 18 in which sensors are provided to measure the vertical displacement, roll and pitch of the or each array in order that the position of each element in the array can be calculated and further corrections made to the phase or travel time of the received signals so as to perform post reception focusing.

20. An apparatus as claimed in claim 1, in which the transmitted signals are in the form of pulses.

21. An apparatus as claimed in claim 1, in which the transmitted signals are frequency modulated.

22. An apparatus as claimed in claim 1, in which each received signal is correlated with the transmitted signal.

23. An apparatus as claimed in claim 1, in which the received signals are correlated with the transmitted signals and in which each transmitter element is actuated more than once.

24. An apparatus as claimed in claim 1, in which, in use, the elements of the transmitting array art energised one at a time, the amplitudes and phases of the receiving array are recorded concurrently for all elements of the receiving array and all relevant path delays, then for each cell the path delay from each transmit element via the cell to each receive element are used to extract the corresponding signal from the stored data, the signals are then scaled in power and summed.

25. A radar system comprising an apparatus, as claimed in claim 1.

26. A ground penetrating radar system for mine detection, comprising an apparatus as claimed in claim 1.

27. A medical imaging system comprising an apparatus as claimed in claim 1.

28. A method of detecting a remote reflector, comprising the steps of: actuating sequentially individual element of a transmit array to receive respective signal, recording reflected signals received at least one element of a receive array for each actuation of the transmit elements; and processing the received signals to shift them so as to synthesise in the received signals the delays and phase shifts that would have been introduced between the signals transmitted from the plurality of transmit elements in order to steer or focus a beam of energy using phased array techniques.

* * * * *